(12) United States Patent
Matsukawa et al.

(10) Patent No.: US 6,790,900 B2
(45) Date of Patent: Sep. 14, 2004

(54) TREATMENT AGENT FOR HYDROPHILICITY AND METHOD FOR PREPARING THEREOF

(75) Inventors: Masahiko Matsukawa, Tokyo (JP); Toshio Inbe, Kanagawa (JP); Tatsuo Yoshida, Tokyo (JP)

(73) Assignee: Nippon Print Co., Ltd., Osaka (JP)

( * ) Notice: Subject to any disclaimer, the term of this patent is extended or adjusted under 35 U.S.C. 154(b) by 377 days.

(21) Appl. No.: 09/854,148

(22) Filed: May 12, 2001

(65) Prior Publication Data

US 2002/0042467 A1 Apr. 11, 2002

(30) Foreign Application Priority Data

May 12, 2002 (JP) .......................... 200-140956

(51) Int. Cl.[7] ................................ C08K 3/34
(52) U.S. Cl. .................... 524/492; 106/491; 523/216; 524/493
(58) Field of Search ................ 524/492, 493; 523/216; 106/491

(56) References Cited

U.S. PATENT DOCUMENTS

| | | | |
|---|---|---|---|
| 3,656,981 A | 4/1972 | Beschke et al. | 106/288 B |
| 4,330,446 A | 5/1982 | Miyosawa | 523/409 |
| 4,495,245 A | 1/1985 | Zunker | 428/403 |
| 5,750,258 A | 5/1998 | Sakai et al. | 428/405 |
| 6,554,916 B2 | 4/2003 | Kojima et al. | 148/275 |

FOREIGN PATENT DOCUMENTS

| | | |
|---|---|---|
| EP | 0180908 | 5/1986 |
| EP | 0676250 | 10/1995 |
| EP | 0911427 | 4/1999 |
| JP | 11-209622 | 8/1999 |
| WO | WO 96/38238 | 12/1996 |

OTHER PUBLICATIONS

Database WPI, Section Ch, Week 198849, Derwent Publications Ltd., London, GB; AN1988–350349, XP002175729 & JP 63 262238 A (Sky Aluminium Co Ltd), Oct. 28, 1988, * abstract *.
Patent Abstract, JP 06228459, Aug. 16, 1994.
Patent Abstract, JP 06300482, Oct. 28, 1994.
Database WPI, Section Ch, Week 198037, Derwent Publications Ltd., London, GB; AN 1980–64934C, XP002179682 & JP 55 099976 A (Kansai Paint Co Ltd), Jul. 30, 1980, (abstract).

Primary Examiner—Edward J. Cain

(57) ABSTRACT

A treatment agent for hydrophilicity preferable for aluminum materials used for heat exchanger parts and air filter parts of air cleaner which can maintain the deodorizing property and hydrohilicity even after a long-time use, and a method of preparing said treatment agent. A treatment agent for hydrophilicity according to this invention comprising silica particulates and polymer of vinyl alcohol series in the weight ratio in the range 30:70~70:30, amounting to 0.2~25 weight percent in total of both relative to the entire treatment agent, in which said silica particulates are coated with said polymer of vinyl alcohol series, and dispersed in aqueous medium as coated particles having the average particle diameter 5~1000 nm.

7 Claims, No Drawings

TREATMENT AGENT FOR HYDROPHILICITY AND METHOD FOR PREPARING THEREOF

BACKGROUND OF THE INVENTION

1. Field of the Invention

The present invention relates to a treatment agent for hydrophilicity preferable for the treatment for hydrophilicity of aluminum materials used for the heat exchanger part of air conditioner, air filter parts of air cleaner, etc., and a method for preparing said agent.

2. Background Art

The heat exchanger part of air conditioner and air filter part of air cleaner are complicated in structure wherein aluminum fins for the heat exchange and removal of atmospheric dust and microbes are held in narrow spaces between aluminum pipes. Therefore, it has been devised so as to facilitate the discharge of condensed water during the cooling operation by making the surface of aluminum fins, etc. hydrophilic. However, since the surface of aluminum fins, etc, which has been made hydrophilic as described above, is exposed to severe conditions including the repeated cycle of "heating←→cooling", and adhesion of condensed water, atmospheric dusts or microbes, it is difficult to maintain the hydrophilicity of the surface of aluminum fins, etc. for a long period of time.

A variety of inventions have been hitherto made to solve these problems, and, for example, in Japanese Patent Laid-open Publication No. Hei 5-202313, a treatment agent for hydrophilicity comprising a mixture of polyvinyl alcohol and water-dispersible silica or a complex thereof, and lithium metasilicate has been disclosed. Herein, lithium metasilicate has been said to be effective in maintaining the lasting hydrophilicity, lowering the freezing point and expressing antimicrobial activity.

In addition, in Japanese Patent Laid-open Publication No. Hei 5-214273, a paint composition consisting of a water-soluble or water-dispersible organic resin, nitrogen-containing anticorrosive and silica particulates, and coated aluminum materials with coating film obtained from this paint composition have been disclosed.

Furthermore, in Japanese Patent Publication No. 2649297, a paint composition for fin materials made of aluminum or aluminum alloy containing water-soluble or water-dispersible organic resin (excluding water-soluble amino resins), water-soluble amino resin, water-dispersed agglutinating colloidal silica containing silanol groups of 50 m$\mu$~2 $\mu$m in particle size, or water-dispersible humed silica powder, and a surfactant with HLB value of 8~18, fin materials and a method for manufacturing these fin materials have been disclosed. This invention aims at obtaining a pre-coated type fin material and a hydrophilic coating film resistant to drawless processing (ironing) during the manufacturing of heat exchanger.

In addition, in Japanese Patent Laid-open Publication No. Hei 10-30069, an aqueous agent to give hydrophilicity containing colloidal silica of 5~100 nm in dispersed particle size and carboxylic acid polymer at pH 1~5, and a method for manufacturing pre-coated fin materials for the heat exchanger using this agent have been disclosed.

All of these aforementioned prior arts have aimed to enhance the hydrophylicity of paint compositions utilizing irregularities of silica surface by using water-soluble or water-dispersible resin together with colloidal silica or particulate silica. However, hydrophilic coatings formed by the combined use of resin and particulate silica tend to deteriorate due to the long time use of heat exchanger. As a result, particulate silica is exposed, posing problems such as emission of silica specific dust smell or stink from materials adsorbed on silica.

SUMMARY OF THE INVENTION

Therefore, it is an object of this invention to provide a treatment agent for hydrophilicity which enables the maintenance of deodorizing capability and hydrophilicity even after the long time use and is preferable for the treatment of aluminum materials to be used in the heat exchanger parts of air conditioner or air filter parts of air cleaner, and a method for manufacturing said agent.

A treatment agent for hydrophilicity of this invention comprises silica particulate and polymer of vinyl alcohol series in an aqueous medium in the weight ratio ranging from 30:70 to 70:30, amounting to 1~25 weight percent relative to the entire treatment agent, wherein said silica particulates are coated with polymer of vinyl alcohol series, and dispersed as coated particles of 5~1000 nm in the average particle diameter in said aqueous medium.

A method for preparing a treatment agent for hydrophilicity of this invention comprises the following processes:

(1) a process for dissolving or dispersing a polymer of vinyl alcohol series to make a concentration ranging 0.3~17.5 weight percent relative to the entire treatment agent, (2) a process for adding silica particulates of 5~100 nm in the average particle diameter to a dissolution or dispersion system of polymer of polyvinyl alcohol series formed in said process (1) to make a concentration in the range of 0.3~17.5 weight percent relative to the entire treatment agent, maintaining a weight ratio between said silica particulates and said polymer of vinyl alcohol series ranging 30:70~70:30, and furthermore, (3) a process for forcibly dispersing "aggregates of polymer of vinyl alcohol series with silica particulates" generated by the addition of said silica particulates.

A treatment agent for hydrophilicity according to this invention is preferable for aluminum materials such as aluminum fins, etc. of evaporator which are exposed to severe conditions including the repeated cycle of "heating←→cooling", and adhesion of condensed water, atmospheric dusts or contaminating microbes.

DETAILED DESCRIPTION OF THE PREFERRED EMBODIMENTS

This invention will be described below in more detail.

The treatment agent for hydrophiliciity of this invention comprising silica particulates coated with polymer of vinyl alcohol series dispersed in aqueous medium is morphologically different from the conventional mixture of silica particulates and resin particles, or silica particulates bound to resin with a silane compound in prior arts.

Silica particulates usable as the raw material of treatment agents for hydrophilicity can be exemplified by humed silica and colloidal silica. Among them, humed silica is prepared by hydrolyzing halosilane such as trichlorosilane and tetrachlorosilane at high temperature in the vapor phase, which is particulate having large surface area. Colloidal silica is a silica sol of the acid- or alkali-stable type dispersed in water. The particle diameter of silica particulates is 5~100 nm, preferably 7~60 nm on the average. When this average particle diameter is less than 5 nm, the irregularity of treated coating film surface is not sufficient, resulting in the decrease in hydrophilicity, and when it exceeds 100 nm, aggregates of large particle diameter are formed in the preparation of treatment agents, aggravating the painting processability.

A typical polymer of vinyl alcohol series usable in this invention is polyvinyl alcohol (PVA) obtained by saponifying a vinyl acetate polymer. PVA with a high saponification level is preferred, especially the one with a saponification level exceeding 98% is preferred. Denatured PVAs, for example, PVA a portion of hydroxyl groups of which are substituted with alkyl groups such as propyl or butyl group can be also used as polymer of vinyl alcohol according to this invention. Furthermore, as the occasion demands, other hydrophilic polymers such as hydroxyl group-containing acrylic resins, polyacrylic acid, polyvinyl sulfonic acid, polyvinylimidazole, polyethylene oxide, polyamide, water-soluble nylon, etc. can be used together with PVA in the amount of less than 50 weight percent relative to PVA.

To prepare a treatment agent for hydrophilicity used in this invention, first, a polymer of vinyl alcohol series (and other hydrophilic polymer, when the occasion demands. Hereafter simply referred to as polymer of vinyl alcohol series.) is dissolved or dispersed to make the concentration 0.3~17.5 weight percent, preferably 0.5~5 weight percent relative to the entire treatment agent. To this mixture were added silica particulates of 5~100 nm, preferably 7~60 nm in the average particle diameter up to the final concentration 0.3~17.5 weight percent, preferably 0.5~5 weight percent relative to the entire treatment agent.

Alternatively, by dispersing silica particulates in an aqueous solution containing polymer of vinyl alcohol series at 5~50 weight percent relative to the silica particulates as solid, said silica particulates are previously coated with polymer of vinyl alcohol series, and then the concentration may be adjusted by adding said aqueous solution of polymer of vinyl alcohol series.

Total content of silica particulates and polymer of vinyl alcohol series is 0.2~25 weight percent, preferably 1~5 weight percent. In this case, the weight ratio between silica particulates and polymer of vinyl alcohol series is in the range 30:70~70:30, preferably 40:60~60:40.

When polymer of vinyl alcohol series is mixed with silica particulates as described above, aggregation occurs by the interaction between them. Therefore, these aggregates are forcibly dispersed using ultrasonic disintegrator or micro-medium disperser, etc. Since disperser such as mixer used for simple stirring and dispersion cannot disperse aggregates, it is necessary to use a device having the grinding function like a mill or vigorous stirring effects on minute parts like the ultrasonic wave. As examples for such disperser, there are an ultrasonic homogenizer (US series) from Nippon Seiki Seisakusho, and a super mill (HM-15) of Inoue Seisakusho. Aggregates thus forcibly dispersed become particles of 5~1000 nm in the average particle diameter comprising silica particulates the surface of which is coated with polymer of vinyl alcohol series, and stabilized as dispersion in aqueous medium.

When the total content of said vinyl alcohol polymer and silica particulate is less than 1 weight percent, effects of lasting hydrophylicity and deodorizer are not expressed, and, on the other hand, when said total content exceeds 25 weight percent, viscosity of the treatment agent becomes high, aggravating the painting processability. In addition, when the weight ratio of silica particulates to polymer of vinyl alcohol series is out of the range 30:70~70:30, with a higher ratio of silica particulates, the coating film formation becomes insufficient, resulting in the exfoliation of the film to emit dust smell from silica and base material, and with a higher ratio of polymer of vinyl alcohol series, hydrophilicity is reduced.

In the aforementioned treatment agent for hydrophilicity, various additives can be added. One of important additives is antimicrobial drug. These antimicrobial drugs can be exemplified by, for example, zinc pyrithione, 2-(4-thiazoryl)-benzimidazole, 1,2-benzisothiazoline, 2-n-octyl-4-isothiazoline-3-on, N-(fluorodichloromethylthio) phthalimide, N,N-dimethyl-N'-phenole-N'-fluorodichloromethylthio)-sulfamide, methyl 2-benzimidazolecarbamate, bis(dimethylthiocarbamoyl)-disulfide, N-(trichloromethylthio)-4-cyclohexane-1,2-dicrboxyimide, and barium metaborate. These antimicrobial drugs can be used also as the antifungal substance, antiseptic and antibacterial drug.

Additives other than those described above can be exemplified by lubricant, surfactant, pigment, dye and inhibitor for giving corrosion resistance.

The treatment agent for hydrophilicity of this invention prepared by the aforementioned preparation method is in a state wherein silica particulates coated with polymer of vinyl alcohol series are dispersed in aqueous medium, wherein the total content of silica particulates and polymer of vinyl alcohol series is 1~25 weight percent and the average particle diameter of coated particles is in the range 5~1000 nm. When this average particle diameter is less than 5 nm, hydrophilicity is not expressed, and when it exceeds 1000 nm, the paint processability is worsened.

In the followings, the treatment agent of this invention will be described with reference to its uses.

Cleaning

Untreated aluminum materials are preferably cleaned with acidic or alkaline cleaners. As the example of pickling agents, there are nitric acid, sulfuric acid, hydrofluoric acid, or pickling agents in any combinations thereof. The acid concentration is preferably 1~10 N, more preferably 3~6 N. Furthermore, it is preferable to supplement these pickling agents with a metal salt or metallic acid salt selected from a group comprising nickel, cobalt, molybdenum and cerium.

Aforementioned metallic salts can be exemplified by iron sulfate, nickel sulfate, cobalt sulfate, cobaltammonium sulfate, cerium sulfate, ceriumammonium sulfate, iron nitrate, cobalt nitrate, nickel nitrate, cerium nitrate, iron acetate, nickel acetate, cobalt acetate, cerium acetate, iron chloride, nickel chloride, cobalt chloride, molybdenum chloride, cerium chloride, etc. And, metallic acid salts can be exemplified by ammonium molybdate, potassium molybdate and sodium molybdate.

The aforementioned metallic salt or metallic acid salt is added to the aqueous solution preferably at 0.01~5 weight percent, more preferably 0.1~1 weight percent. Combination of metallic salts or metallic acid salts in the aforementioned concentration range is advantageous in that the pickling of deposits derived from solders can be more effectively carried out in the aluminum-made heat exchanger (such as evaporator, etc.).

Alkaline cleaners can be exemplified by those containing at least one base selected out of sodium hydroxide, sodium silicate and sodium phosphate. To enhance the cleaning capability, surfactant may be added to alkaline cleaners.

For cleaning aluminum materials, they may be sprayed with the aforementioned cleaners, or immersed in the cleaners in a bath. In this case, the temperature of cleaners is preferably 10~85° C., and the contact time desirably for 30s~5 min. When the liquid temperature is less than 10° C., or the contact time is shorter than 30 s, the precipitate removal sometimes may become insufficient. When the liquid temperature exceeds 85° C., or the contact time is longer than 5 min, etching may often become excessive. After the cleaning, aluminum materials are washed with water, and subjected to the succeeding anti-rust treatment.

Anti-rust Treatment

Anti-rust treatment methods include those by the chemical transformation and undercoating anti-rust treatment with resin primers. Among them, as the chemical transformation treatment agent, the conventionally known chromium chromate treatment agent, chromate phosphate treatment agent or non-chromium treatment agent can be used. The chromium chromate treatment agent is an aqueous solution containing chromic acid, fluoride and strong acid, including the reaction type chromate and electrolyte type chromate with the trivalent chromium as the principal ingredient, and a spreading type chromate in which hexavalent and trivalent chromiums are mixed. On the other hand, the chromate phosphate treatment agent is a mixed aqueous solution containing chromic acid, orthophosphate and fluoride. For the chemical transformation treatment carried out with these chromate treatment agents, it is required to control each of the amounts of hexavalent chromium ion, phosphate ion and fluoride ion.

Example of non-chromium treatment agents can be exemplified by zirconium salts, titanium salts, silicon salts, borates and permanganates. Fluorides of these salts can be also preferably used, and, furthermore, it is also preferred to supplement these salts add fluorides with acids such as phosphoric acid, manganic acid, permanganic acid, vanadic acid, tungstic acid, molybdic acid, etc.

The aforementioned resin primer can be exemplified by water-soluble or water-dispersible aqueous resins. Specific examples of these resins include aqueous polymer compounds having carboxyl or hydroxyl group such as poly (meta) crylic acid, polyvinyl alcohol, carboxymethyl cellulose, etc., aqueous phenolic resin, aqueous polyester resin, aqueous epoxy resin, aqueous polyurethane, aqueous amino resin, etc.

Corrosion resistance of coating film can be improved by supplementing the aforementioned resin primers with metallic compounds such as zirconium compounds, etc. including fluorozirconic acid, fluorozirconiumammonium, etc. in the concentration of 100~10000 ppm.

There is no particular limitation to the chemical transformation treatment method, which can be performed by the immersion method, spraying method. etc. However, for an evaporator having a complicated shape, the immersion method is preferred. Treatment temperature is preferably the room temperature or slightly warmer temperature than that, in the range 10~50° C., and the treatment time is preferably 3s~5 min. Amount of the anti-rust coating film is preferably 10~300 mg/m$^2$ as the amount of each element (Cr, Zr, Ti, etc.) adhered to the surface in the case of chemical transformation treatment coating film. In the case of resin primers, after the aforementioned treatment, it is preferable to bake resin primers at 100~220° C., preferably at 150~200° C. for 10~60 min to make the dried coating film 0.1~10 μm thick. When the baking temperature of resin primer is less than 100° C., the film formation becomes insufficient, and when said temperature exceeds 220° C., the lasting hydrophilicity is reduced. When the resin primer coating film is less than 0.1 μm thick, the rust preventive capacity is often insufficient, and when said film exceeds 10 μm thick, it becomes uneconomical. After the rust preventive treatment, washing with water is performed as the occasion demands prior to the subsequent treatment for hydrophilicity.

Treatment for Hydrophilicity

The treatment agent for hydrophilicity of this invention is used. There is no particular limitation to the method for applying said treatment agent, and the treatment can be carried out, for example, by the immersion method, spraying method, roll coating method, brushing method, etc. However, it is preferable to use the immersion method for the heat exchanger or air filter because of their complicated shape. Preferable temperature of the treatment liquid is around 10~50° C., and treatment time is about 3 s~5 min. The amount of coating film is controlled to be in the range 0.1~3 g/m$^2$, preferably 0.2~1 g/m$^2$. When the amount of coating film is less than 0.1 g/m$^2$, hydrophilicity is not expressed, and when it exceeds 3 g/m$^2$, the productivity of coating film is reduced.

After the treatment for hydrophilicity, the hydrophilic coating film can be obtained by baking the treated surface at 100~220° C., preferably 150~200° C. for 10~60 min. When the baking temperature is less than 100° C., film formation becomes insufficient, and, on the other hand, when it exceeds 220° C., the lasting hydrophilicity is reduced. It is preferable that aluminum materials thus treated with the treatment agent for hydrophilicity of this invention have the hydrophilic coating film formed in the amount of 0.1~3 g/m$^2$.

EXAMPLES

In the following, this invention will be further described more specifically with reference to examples and comparative examples.

Example 1

To an aqueous solution of 25 weight parts of polyvinyl alcohol powder (saponification level 98% or more) dissolved in 950 weight parts of pure water was added 25 weight parts of humed silica (average particle diameter 40 nm), and the resulting mixture was stirred to form aggregates. These aggregates were then forced to disperse using an ultrasonic disperser (ultrasonic homogenizer, Nihon Seiki) to obtain silica particulates coated with polyvinyl alcohol of the average particle diameter 500 nm dispersed in water. Furthermore, to the resulting dispersion in aqueous medium, zinc pyrithione as the antimicrobial drug was added to obtain the treatment agent for hydrophilicity. In this case, the average particle diameter was measured on a portion of said treatment agent for hydrophilicity thus obtained which was diluted with deionized water using a dynamic light scattering measuring instrument (ELS-800, Ohtsuka Electronics).

To assess the treatment agent for hydrophilicity obtained as described above, evaporator was subjected to the treatment for hydrophilicity. As the pretreatment of treatment for hydrophilicity, using a pickling agent containing 10 weight percent (2.3 N) nitric acid, an evaporator was immersed in a bath containing this cleaner pre-warmed to 65° C. for 4 min, and thoroughly washed with tap water after taken up from the bath. Further, this evaporator was immersed in a bath of chromium chromate (Alsurf 600LN2, Nippon Paint) pre-warmed to 65° C. for 4 min, and then thoroughly washed with tap water.

Then, this evaporator was immersed into a bath of the aforementioned treatment agent for hydrophilicity at 20° C.

for 1 min, taken up, and heat dried at the reached temperature 180° C. for 5 min to finish the evaporator treated for hydrophilicity with the coating film in the amount of 1 g/m². Types of the pickling agent and chemical transformation agent, and compositions of treatment agents for hydrophilicity are shown in Table 1.

The evaporator thus treated for hydrophilicity was assessed for its lasting hydrophilicity and odor according to the following methods, and the results are shown in Table 2.

Assessment

Lasting Hydrophilicity

Evaporator treated for hydrophilicity was immersed in water, and, 500 h later, the contact angle with water was measured. Contact angle less than 30° indicates the maintenance of hydrophilicity, and that less than 20° is assessed as excellent.

Odor

Evaporator treated for hydrophilicity was immersed in water, and, 500 h later, it was smelled and assessed according to the following five stage scales:

| | |
|---|---|
| 0 point | no smell |
| 1 point | barely, faint smell |
| 2 points | easily detectable smell |
| 3 points | obvious smell |
| 4 points | strong smell |
| 5 points | very strong smell |

Examples 2~6 and Comparative Examples 1~6

Except that weight ratios between silica particulates and polyvinyl alcohol in the treatment agent for hydrophilicity (examples 5 and 6, and comparative examples 3~5) were altered, or that pickling agents or chemical transformation treatment agents were changed (examples 2~4, and comparative examples 1 and 2), the treatment agent for hydrophilicity was prepared similarly as in example 1, and an evaporator was treated using said agent. These results are shown in Table 2.

TABLE 1

| | Pickling agent | Chemical transformation agent | Treatment for hydrophilicity | | |
|---|---|---|---|---|---|
| | | | Content of silica particulates | PVA content | Anti-microbial agent |
| Example 1 | Containing 10% nitric acid | Chromium chromate | 2.5% | 2.5% | + |
| Example 2 | 10% Nitric acid + 5% sulfuric acid | Chromium chromate | 2,5% | 2.5% | + |
| Example 3 | 10% Nitric acid + 5% sulfuric acid | Chromium phosphate | 2.5% | 2.5% | + |
| Example 4 | 10% Nitric acid + 5% sulfuric acid | Chromium phosphate | 2.5% | 2.5% | + |
| Example 5 | 10% Nitric acid + 5% sulfuric acid | Chromium phosphate | 2.0% | 2.5% | + |
| Example 6 | 10% Nitric acid + 5% sulfuric acid | Chromium phosphate | 2.5% | 2.0% | + |
| Comparative example 1 | No pickling | Chromium phosphate | 2.5% | 2.0% | + |

TABLE 1-continued

| | Pickling agent | Chemical transformation agent | Treatment for hydrophilicity | | |
|---|---|---|---|---|---|
| | | | Content of silica particulates | PVA content | Anti-microbial agent |
| Comparative example 2 | 10% Nitric acid + 5% sulfuric acid | No chemical transformation treatment | 2.5% | 2.5% | + |
| Comparative example 3 | 10% Nitric acid + 5% sulfuric acid | Chromium phosphate | 1.0% | 2.0% | + |
| Comparative example 4 | 10% Nitric acid + 5% sulfuric acid | Chromium phosphate | 2.5% | 1.0% | + |
| Comparative example 5 | 10% Nitric acid + 5% sulfuric acid | Chromium phosphate | 2.5% | 2.5% | - |
| Comparative example 6 | 10% Nitric acid + 5% sulfuric acid | Chromium phosphate | 2.5% (no dispersion) | 2.5% (no dispersion) | + |

Chromium phosphate (Alsurf 407/47, Nippon Paint Co., Ltd.)
Chromium chromate (Alsurf 600LN2, Nippon Paint Co., Ltd.)

TABLE 2

| | Lasting hydrophilicity | Odor |
|---|---|---|
| Example 1 | 20° | 1.5 points |
| Example 2 | 20° | 1.5 points |
| Example 3 | 20° | 1.5 points |
| Example 4 | 20° | 1.5 points |
| Example 5 | 25° | 1.5 points |
| Example 6 | 17° | 1.5 points |
| Comparative example 1 | 20° | 3.0 points (dust, rust odor) |
| Comparative example 2 | 20° | 3.5 points (dust, rust odor) |
| Comparative example 3 | 45° | 1.5 points |
| Comparative example 4 | 15° | 3.0 points (dust odor) |
| Comparative example 5 | 20° | 3.0 points (mold odor) |
| Comparative example 6 | 45° | 1.5 points |

As clearly shown in Table 2, the evaporator treated for hydrophilicity using the treatment agent for hydrophilicity prepared in this example was excellent in its lasting hydrophilicity, maintaining the contact angle with water around 20° even after 500 h. It smelled only faintly after immersed in water for 500 h.

A treatment agent for hydrophilicity of this invention comprises silica particulates coated with polymer of vinyl alcohol series. Therefore, not only aluminum materials made hydrophilic with the present treatment agent can maintain hydrophilicity by the surface irregularity of silica particulates but also it is unlikely that coated silica particulates are directly exposed to the atmosphere, or washed out by the condensed water even with a slight deterioration of hydrophilic coating film after a long-time use. As a result, aluminum materials thus made hydrophilic are excellent in the lasting hydrophilicity, and effective in preventing the generation of silica-specific dust smell and smell of bacteria adhering to silica.

What is claimed is:

1. A treatment agent for hydrophilicity comprising silica particulates and polymer of vinyl alcohol series in the weight ratio in the range 30:70~70:30, amounting to 0.2~25 weight percent in total of both, in which said silica particulates are coated with said polymer of vinyl alcohol series, and dispersed in aqueous medium as coated particles having the average particle diameter 5~1000 nm.

2. A method for preparing a treatment agent for hydrophilicity, comprising:

dissolving or dispersing polymer of vinyl alcohol series in a 0.3~17.5 weight percent relative to the entire treatment agent, adding silica particulates of 5~100 nm in the average particle diameter to a dissolution or dispersion system of polymer of vinyl alcohol series formed in the previous process in a 0.3~17.5 weight percent relative to the entire treatment agent and in an amount so that the weight ratio of said silica particulates and said polymer of vinyl alcohol series becomes 30:70~70:30, and furthermore, forcibly dispersing "aggregates of polymer of vinyl alcohol series with silica particulates" formed by the addition of said silica particulates.

3. A treatment agent for hydrophilicity consisting essentially of silica particulates and polymer of vinyl alcohol series in the weight ratio in the range 30:70~70:30, amounting to 0.2~25 weight percent in total of both, in which said silica particulates are coated with said polymer of vinyl alcohol series, and dispersed in aqueous medium as coated particles having the average particle diameter 5~1000 nm.

4. The treatment agent according to claim 1, and further comprising an antimicrobial drug.

5. The treatment agent according to claim 4, wherein the antimicrobial drug comprises zinc pyrithione, 2-(4-thiazoryl)-benzimidazole, 1,2-benzisothiazoline, 2-n-octyl-4-isothiazoline-3-on, N-(fluorodichloromethylthio) phthalimide, N,N-dimethyl-N'-phenole-N'-(fluorodichloromethylthio)-sulfamide, methyl 2-benzimidazolecarbamate, bis(dimethylthiocarbamoyl)-disulfide, N-(trichloromethylthio)-4-cyclohexane-1,2-dicrboxyimide, or barium metaborate.

6. The treatment agent according to claim 1, wherein the treatment agent consists essentially of silica particulates and polymer of vinyl alcohol series in the weight ratio in the range 30:70~70:30, amounting to 0.2~25 weight percent in total of both, in which said silica particulates are coated with said polymer of vinyl alcohol series, and dispersed in aqueous medium as coated particles having the average particle diameter 5~1000 nm; and an antimicrobial drug.

7. The treatment agent according to claim 6, wherein the antimicrobial drug comprises zinc pyrithione, 2-(4-thiazoryl)-benzimidazole, 1,2-benzisothiazoline, 2-n-octyl-4-isothiazoline-3-on, N-(fluorodichloromethylthio) phthalimide, N,N-dimethyl-N'-phenole-N'-(fluorodichloromethylthio)-sulfamide, methyl 2-benzimidazolecarbamate, bis(dimethylthiocarbamoyl)-disulfide, N-(trichloromethylthio)-4-cyclohexane-1,2-dicrboxyimide, or barium metaborate.

* * * * *